United States Patent [19]

Smith

[11] Patent Number: 4,461,854
[45] Date of Patent: Jul. 24, 1984

[54] ROOM TEMPERATURE VULCANIZABLE POLYSILOXANE HAVING A HEAT-ACTIVATED CATALYST

[75] Inventor: Robert A. Smith, Schenectady, N.Y.

[73] Assignee: General Electric Company, Waterford, N.Y.

[21] Appl. No.: 407,017

[22] Filed: Aug. 11, 1982

[51] Int. Cl.$^3$ ............................................. C08L 83/06
[52] U.S. Cl. .................................. 523/211; 524/398; 524/399; 524/400; 524/268; 525/477
[58] Field of Search ................ 523/211; 524/398, 399

[56] References Cited

U.S. PATENT DOCUMENTS

| | | | |
|---|---|---|---|
| 2,843,555 | 7/1958 | Berridge | 528/39 |
| 3,070,559 | 12/1962 | Nitzsche et al. | 523/211 |
| 3,236,806 | 2/1966 | Dunham | 523/211 |
| 3,445,418 | 5/1969 | Gibbon et al. | 524/773 |
| 3,455,848 | 7/1969 | Yoncoskie et al. | 521/170 |
| 3,532,649 | 10/1970 | Smith et al. | 525/479 |
| 3,574,785 | 4/1971 | Chadho et al. | 525/477 |
| 3,676,420 | 7/1972 | Fulton et al. | 260/185 |
| 3,696,090 | 10/1972 | Lampe | 523/121 |
| 3,701,753 | 10/1972 | Shaw | 523/121 |
| 3,702,835 | 11/1972 | Greenlee | 524/780 |
| 3,772,240 | 11/1973 | Greenlee | 524/405 |
| 3,839,246 | 10/1974 | Hamilton et al. | 523/213 |
| 3,847,848 | 11/1974 | Beers | 523/213 |
| 3,865,759 | 2/1975 | Smith | 260/185 |
| 3,882,083 | 5/1975 | Berger et al. | 528/15 |
| 3,888,815 | 6/1975 | Bessmer et al. | 524/703 |
| 3,931,105 | 1/1976 | Smith | 528/33 |
| 3,957,704 | 5/1976 | Smith et al. | 528/18 |
| 4,124,560 | 11/1978 | Herzig | 524/847 |
| 4,131,588 | 12/1978 | Smith, Jr. | 524/789 |

FOREIGN PATENT DOCUMENTS 764246 12/1956 United Kingdom ...................... 2/7

*Primary Examiner*—Wilbert J. Briggs, Sr.
*Attorney, Agent, or Firm*—Gary L. Loser; Ernest F. Chapman; John L. Young

[57] ABSTRACT

A two-component room temperature vulcanizable polysiloxane composition curable in the presence of a heat-activated catalyst is disclosed. The working life of a condensation curable organopolysiloxane containing terminal silicon-bonded hydroxy groups in a first component is extended by using a metallic salt of an organic carboxylic acid catalyst in a second component by providing in combination with the metallic salt of an organic carboxylic acid catalyst, a solid, inert barrier material capable of melting at an elevated temperature, whereby the catalyst is activated when heat applied thereto, melts the solid barrier material. A cross-linking agent and optionally, a filler, are used in the components. In one embodiment, the catalyst is a tin carboxylate used as a core material and the solid, inert barrier material is calcium stearate used as a wall material to encapsulate the catalyst material.

37 Claims, No Drawings

ROOM TEMPERATURE VULCANIZABLE POLYSILOXANE HAVING A HEAT-ACTIVATED CATALYST

BACKGROUND OF THE INVENTION

The present invention relates to a room temperature vulcanizable polysiloxane composition, and more particularly, to a two-component room temperature vulcanizable polysiloxane composition containing terminal silicon-bonded hydroxy groups and having an extended work life.

Room temperature vulcanizable silicone rubber compositions are usually prepared either in a one-component form or a two-component form. Generally, in the two-component room temperature vulcanizable silicone rubber compositions, there is present a base silanol-stopped diorganopolysiloxane, optionally, filler and other additives which form a first component which is stored as such. As part of the composition, there is also formed a second component containing a catalyst which is usually a metal salt of a carboxylic acid, optionally, filler, and other additives. The second component is mixed and stored separately from the first component or base composition described above. One or both of the components described above must also have a cross-linking agent, such as, an alkyl silicate, or partial hydrolysis products of such alkyl silicates. When it is desirable to cure the composition to form a cured polysiloxane elastomer, the first component and second component are mixed, and the resulting mixture is allowed to cure at room temperature, and in certain cases, at elevated temperatures, to produce a silicone elastomer.

The catalyst component, that is, the second component, is maintained separate from the base component, that is, the first component, because if the catalyst component is mixed with the base component, then the materials begin to cure immediately to form a silicone elastomer, and they are generally completely cured within about 24 hours. Thus, for storage purposes, the catalyst component is maintained separately from the base component until it is desired to mix the components and apply them as desired to produce a silicone elastomer.

Examples of prior art two-component room temperature vulcanizable silicone compositions and improvements therein are found in U.S. Pat. No. 3,445,418, U.S. Pat. No. 3,696,090, U.S. Pat. No. 3,701,753, U.S. Pat. No. 3,702,835, U.S. Pat. No. 3,839,246, U.S. Pat. No. 3,847,848, U.S. Pat. No. 3,957,704, U.S. Pat. No. 4,124,560 and U.S. Pat. No. 4,131,588. The foregoing patents generally disclose that one of the components in the composition comprises a metal salt of a carboxylic acid as a catalyst to speed up the rate of reaction of the organopolysiloxane composition to form a silicone elastomer. It is generally disclosed in the prior art that the catalyst can be selected from the metal salts of carboxylic acids, and more specifically, that the catalyst can be selected from the metal salts of a monocarboxylic acid or a dicarboxylic acid where the metal ion varies from lead to manganese in the periodic table of the elements (U.S. Pat. No. 4,131,588). In other prior art references, for example, in U.S. Pat. No. 3,696,090, U.S. Pat. No. 3,701,753, U.S. Pat. No. 3,847,848, U.S. Pat. No. 3,888,815 and U.S. Pat. No. 3,957,704, it is disclosed that the metal ion of the metal salt of the carboxylic acid is one selected from the group consisting of lead, tin, zirconium, antimony, iron, cadmium, barium, calcium, titanium, bismuth and manganese. Generally, the carboxylic acids from which the salts of the metals are derived, are either soluble or insoluble in the organopolysiloxane and can be aliphatic or aromatic and include the naphthenate, hexoate, octoate, laurate and stearate.

In contrast to the platinum-catalyzed addition cured vinyl-stopped dimethylpolysiloxanes which are easily heat accelerable, it is well known that the condensation-cured silanol-stopped organopolysiloxanes do not possess appreciable heat accelerable cures. The addition-cured platinum-catalyzed systems can be formulated to give long "bath lives" at room temperature, and can then be cured rapidly at elevated temperatures. This feature has enabled the vinyl addition cured systems to enjoy substantial use in the potting or encapsulating of electronic components and in the coatings industry where a long work time with the catalyzed material is desirable to operate efficiently the dispensing equipment so that the material does not cure in the equipment, yet can be cured rapidly to achieve rapid production rates of the finished parts. Accordingly, it is desirable to formulate the silanol-stopped organopolysiloxane compositions catalyzed by the metallic salts of organic carboxylic acids to extend their "bath lives" or working lives so that they can be used in applications similar to those in which the addition cured vinyl-stopped organopolysiloxanes are used. Thus, it is desirable to extend the working life of the room temperature vulcanizable condensation cured organopolysiloxanes having terminal silicon-bonded hydroxy groups so that they can be used in the potting or encapsulating of electronic components and in the coatings industry where a long work time with the catalyzed material is desirable in order to operate efficiently the dispensing equipment so that the condensation cured organopolysiloxanes containing terminal silicon-bonded hydroxy groups do not cure in the equipment, yet cure rapidly in the presence of the metallic salts of organic carboxylic acid catalysts even at room temperatures.

SUMMARY OF THE INVENTION

Accordingly, it is an object of the present invention to provide a room temperature, condensation curable organopolysiloxane containing terminal silicon-bonded hydroxy groups in a first component and a metallic salt of an organic carboxylic acid catalyst in a second component wherein the organopolysiloxane has an extended bath life or working life.

It is another object of the present invention to provide an improved two-component room temperature vulcanizable polysiloxane composition curable in the presence of a catalyst comprising a metallic salt of an organic carboxylic acid.

Yet another object of the present invention is to provide an improved two-component room temperature vulcanizable polysiloxane wherein the organopolysiloxane contains terminal silicon-bonded hydroxy groups in the presence of a catalyst comprising a metallic salt of an organic carboxylic acid in which the metal ion is selected from the group consisting of tin, lead, zirconium, antimony, iron, cadmium, barium, calcium, titanium, bismuth and manganese.

Another object of the present invention is to provide a two-component room temperature vulcanizable polysiloxane composition wherein the organopolysiloxane contains terminal silicon-bonded hydroxy groups curable in the presence of a metallic salt of an organic carboxylic acid wherein the two-components can be mixed at room temperature with little or no curing until the catalyst is activated by heat.

Another object of the present invention is to provide a method of extending the working life of a condensation curable organopolysiloxane containing terminal silicon-bonded hydroxy groups in a first component and a metallic salt of an organic carboxylic acid catalyst in a second component.

Still another object of the present invention is to provide an improved method of curing a room temperature vulcanizable polysiloxane composition wherein the organopolysiloxane contains terminal silicon-bonded hydroxy groups and the catalyst therefor comprises a metallic salt of an organic carboxylic acid.

These and other objects of the present invention will become apparent from the following description and are accomplished by the means set forth below.

In accordance with the foregoing objects, there is provided a condensation curable organopolysiloxane wherein the organopolysiloxane contains terminal silicon-bonded hydroxy groups in a first component and a metallic salt of an organic carboxylic acid catalyst in a second component wherein there is provided in combination with the metallic salt of the organic carboxylic acid catalyst, a solid, inert barrier material capable of melting at an elevated temperature, but which does not promote room temperature curing whereby the catalyst is activated when heat applied thereto, melts the solid barrier material. The solid, inert barrier material capable of melting at an elevated temperature, prevents the catalyst from, or delays the catalyst in, curing for an extended period of time, thereby improving the work life of the composition, until the solid, inert barrier material is melted, thereby exposing or releasing the catalyst material. Thus, the catalyst becomes activated when heat is applied thereto and melts the solid barrier material.

In one aspect of the present invention, there is provided a two-component room temperature vulcanizable polysiloxane composition curable in the presence of a heat activated catalyst comprising:
(A) 100 parts by weight of a mixture comprised of:
  (i) an organopolysiloxane containing terminal silicon-bonded hydroxy groups;
  (ii) optionally, a cross-linking agent; and
  (iii) optionally, a filler; and
(B) about 5 to about 15 parts by weight of a catalyst-cntaining component comprised of:
  (iv) a catalyst comprising a metallic salt of an organic carboxylic acid in which the metal ion is selected from the group consisting of tin, lead, zirconium, antimony, iron cadmium, barium, calcium, titanium, bismuth and manganese, the catalyst being in combination with a solid, inert barrier material capable of melting at an elevated temperature, but which does not promote room temperature curing, whereby the catalyst is activated when heat applied thereto melts the solid barrier material;
  (v) about 1.5 to about 20.0 weight % of component (B) of a cross-linking agent;
  (vi) about 5 to about 50 weight % of component (B) of a filler; and
  (vii) about 5 to about 50 weight % of component (B) of a polyorganosiloxane having no silanol-stopped terminal groups.

In another aspect of the present invention, there is also provided a method of extending the working life of condensation curable organopolysiloxanes wherein the organopolysiloxane contains terminal silicon-bonded hydroxy groups, in a first component and a metallic salt of an organic carboxylic acid catalyst in a second component, comprising providing in combination with the metallic salt of an organic carboxylic acid catalyst, a solid, inert barrier material capable of melting at an elevated temperature, but which does not promote room temperature curing, whereby the catalyst is activated when heat applied thereto, melts the solid barrier material.

There is also provided in accordance with at least some of the objects of the present invention a process for forming a cured room temperature vulcanizable, condensation-curable organopolysiloxane, comprising: mixing (A) 100 parts by weight of a first component comprised of (i) a base organopolysiloxane containing terminal silicon-bonded hydroxy groups; (ii) optionally a cross-linking agent; and (iii) optionally, a filler; with (B) about 5 to about 15 parts by weight of a catalyst-containing second component comprised of (iv) a catalyst comprising a metallic salt of an organic carboxylic acid in which the metal ion is selected from the group consisting of tin, lead, zirconium, antimony, iron, cadmium, barium, calcium, titanium, bismuth and manganese, the catalyst being in combination with a solid, inert barrier material capable of melting at an elevated temperature, but which does not promote room temperature curing, whereby the catalyst is activated when heat applied thereto melts the solid barrier material; (v) about 1.5 to about 20.0 weight % of component (B) of a cross-linking agent; (vi) about 5 to about 50 weight % of component (B) of a filler; and (vii) about 5 to about 50 weight % of component (B) of a polyorganosiloxane carrier or diluent having no silanol-stopped terminal groups (preferably an alkyl-stopped organopolysiloxane carrier or diluent); and heating the mixture at an elevated temperature sufficient to melt the solid, inert barrier material, thereby releasing the catalyst; and allowing the mixture to cure in the presence of the catalyst.

It has been found in accordance with the present invention that when certain metallic salts of an organic carboxylic acid are used as a catalyst in combination with a solid, inert barrier material capable of melting at an elevated temperature, but wherein the barrier material does not promote any substantial amount of room temperature curing, whereby the catalyst is activated when heat applied thereto melts the solid barrier material, to cure condensation curable silanol-stopped organopolysiloxanes, the silicone rubbers prepared thereby have properties which permit their use in the potting or encapsulating of electronic components and in the coating industry. The compositions and processes of the present invention may be used, for example, where a long work time with the catalyzed material is desirable to operate efficiently dispensing equipment so that the material does not cure in the equipment, yet it can be cured rapidly to achieve rapid production rates of the finished parts. By using the special catalysts of the present invention which are provided in combination with a solid, inert barrier material capable of melting at an elevated temperature and whereby the catalyst is activated only when heat is applied thereto and melts the solid barrier material, conventional, condensation-cured, silanol-stopped organopolysiloxanes have an extended "bath life" at room temperature. More specifically, it has been found that the bath life of the conventional condensation cured, silanol-stopped dimethylpolysiloxane silicone rubbers can be extended at least two days and in certain cases as long as nine days. Furthermore, the catalyst component or system prepared in accordance with the present invention appears to have a good shelf age.

The solid, inert barrier material is described herein as a material capable of melting at an elevated temperature, and as used herein, the elevated temperature is broadly described as the melting point or a temperature higher than the melting point of the solid, inert barrier material used in combination with the metallic salt of an organic carboxylic acid catalyst.

DETAILED DESCRIPTION OF THE INVENTION

The base polymer of the room temperature vulcanizable polysiloxane compositions of the present invention may be any organopolysiloxane containing terminal silicon-bonded hydroxy groups, and any condensation curable organopolysiloxane containing terminal silicon-bonded hydroxy groups may be used in a first component of the present invention.

Examples of the organopolysiloxanes containing terminal silicon-bonded hydroxy groups which may be used as the base polymer of the present invention, are disclosed in the prior art and include up to 60% by weight of a high molecular weight organopolysiloxane of a low molecular weight fluid organopolysiloxane containing terminal silicon-bonded hydroxy groups and having a viscosity within the range of 100 to $3.0 \times 10^5$ centipoise at 25° C. wherein the organic groups of the low molecular weight organopolysiloxane represent monovalent hydrocarbon radicals such that the blend of the high molecular weight organopolysiloxane and low molecular weight organopolysiloxane has a viscosity in the range of $3 \times 10^6$ to $25 \times 10^6$ centipoise at 25° C. as described in U.S. Pat. No. 3,696,090; the linear, fluid organopolysiloxane containing terminal silicon-bonded hydroxy groups convertible to the cured, solid, elastic state and having a viscosity of from 1,000 to 50,000 centipoise when measured at 25° C., the organic groups of the organopolysiloxanes being selected from the group consisting of monovalent hydrocarbon radicals and halogenated aryl radicals attached to silicon by carbon-silicon linkages as described in U.S. Pat. No. 2,843,555; the base polymer of the formula,

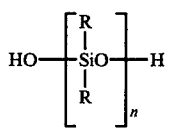

(1)

where R is a member selected from the class consisting of monovalent hydrocarbon radicals, halogenated monovalent hydrocarbon radicals, and cyanoalkyl radicals, and n has a value of 10 to 1,000 such that the viscosity of the base polymer varies from 1,000 to 100,000 centipoise at 25° C. as disclosed in U.S. Pat. No. 3,701,753; the linear, fluid organopolysiloxane containing terminal silicon-bonded hydroxy groups and having a viscosity of 500 to 10,000,000 centipoise when measured at 25° C., the organic groups of the organopolysiloxane representing monovalent hydrocarbon radicals as disclosed in U.S. Pat. No. 3,839,246; the base linear fluid of organopolysiloxane containing terminal silicon-bonded hydroxy groups and having a viscosity of 1,000 to 10,000,000 centipoise when measured at 25° C., the organic groups of the organopolysiloxane being selected from the class consisting of monovalent hydrocarbon radicals, halogenated monovalent hydrocarbon radicals and cyanoalkyl radicals, the preferred base linear fluid diorganopolysiloxane containing terminal silicon-bonded hydroxy groups having the same formula as formula (1) above where R is selected from monovalent hydrocarbon radicals and halogenated monovalent hydrocarbon radicals, and n is a whole number that varies from 300 to 5,260, and the radical R is more preferably selected from the class consisting of alkyl radicals, such as, methyl, ethyl, propyl, butyl, hexyl, and the like, aryl radicals, such as phenyl, diphenyl, methyl, and the like, alkenyl radicals, such as tolyl, xylyl, ethylphenyl and the like, aralkyl radicals, such as benzyl, phenyl, ethyl, and the like, haloaryl and haloalkyl radicals, such as, chlorophenyl, tetrachlorophenyl, difluorophenyl, and the like, and alkenyl radicals, such as, vinyl, allyl, and the like or cyanoalkyl, cycloalkyl and cycloalkenyl radicals, as disclosed in U.S. Pat. No. 3,847,848; the linear fluid organopolysiloxanes containing terminal silicon-bonded hydroxy groups, convertible to a cured, solid state, alone, or in a mixture with a linear, fluid organopolysiloxane having a 1:1 ratio of terminal silicon-bonded triorganosilyloxy to terminal silicon-bonded hydroxy groups, covertible to a cured solid state as disclosed in U.S. Pat. No. 3,865,759 and U.S. Pat. No. 3,931,105; the hydroxy-containing polysiloxane fluid of the formula, $$R_a SiO_{4-a/2}$$ (2)

where the polysiloxane fluid is chain-stopped with mixtures of —OH groups and $R_3SiO_{0.5}$ units, where the ratio of the $R_3SiO_{0.5}$ units to OH radicals in the fluid varies from 3:1 to 1:1 as disclosed in U.S. Pat. No. 3,957,704; the diorganopolysiloxane having a viscosity varying from 100 to 500,000 centipoise at 25° C. wherein said organo groups are selected from the class consisting of monovalent hydrocarbon radicals and halogenated monovalent hydrocarbon radicals, wherein preferred diorganopolysiloxanes have the same formula as formula (1) above where R is selected from the class consisting of alkyl radicals, alkenyl radicals, phenyl radicals and fluoroalkyl radicals of 1 to 8 carbon atoms, and where n varies from 350 to 15,000 as disclosed in U.S. Pat. No. 4,131,588; and the like.

It is within the scope of the present invention to use one organopolysiloxane containing terminal silicon-bonded hydroxy groups or mixtures of organopolysiloxanes containing terminal silicon-bonded hydroxy groups. It is also within the scope of the present invention to use various additives and other organopolysiloxanes which are inert, that is, which do not interact with the organopolysiloxane containing terminal silicon-bonded hydroxy groups while the organopolysiloxane containing terminal silicon-bonded hydroxy groups is isolated from the catalyst component of the composition, or which do not interfere with the stability of composition after the catalyst component is introduced into the organopolysiloxane containing terminal silicon-bonded hydroxy groups or with the stability of the final cured composition. For example, many of the patents discussed above disclose certain additives which may be used with the organopolysiloxane having terminal hydroxy groups bonded to the silicon atom, and include, an organotriacyloxysilane as disclosed in U.S. Pat. No. 3,701,753; a linear, fluid organopolysiloxane having a 1:1 ratio of terminal silicon-bonded triorganosilyloxy to terminal silicon-bonded hydroxy groups as disclosed in U.S. Pat. No. 3,865,759 and U.S. Pat. No. 3,931,105; the mixtures discussed above in U.S. Pat. No. 3,957,704; the mixture consisting of a linear organopolysiloxane of the formula,

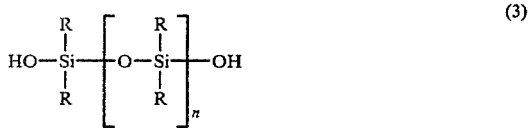

(3)

wherein R is a monofunctional hydrocarbon radical, and n is a positive integer of a value such that the viscosity amounts to between about 500 and 1,000,000 centipoise at a temperature of 25° C., a linear organopolysiloxane of the formula

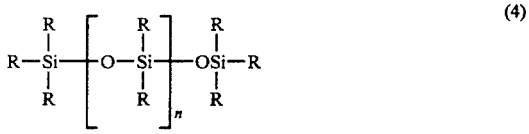

(4)

where n is a positive integer of a value such that the viscosity amounts to between about 5 and 1,000 centipoise at a temperature of 25° C., and R is defined as above, and a linear organopolysiloxane of the formula,

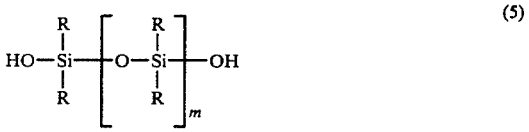

(5)

where R is the same as defined in formula (4) above, and m is a positive integer of a value such that the viscosity amounts to between about 2 and 50 centipoise at a temperature of 25° C. as disclosed in U.S. Pat. No. 4,124,560; and the like.

As used herein, the phrases, silanol-stopped organopolysiloxane, organopolysiloxane having terminal hydroxy groups bonded to the silicon atom and any other equivalent terms, may be used interchangeably. Furthermore, any organopolysiloxane having terminal hydroxy groups bonded to the silicon atom or any mixture containing an organopolysiloxane having terminal hydroxy groups bonded to the silicon atom which requires a metallic salt of an organic carboxylic acid as a catalyst to cure or cause the condensation of the organopolysiloxane, may be used in the room temperature vulcanizable polysiloxane composition curable in the presence of a heat activated catalyst or in the method of extending the working life of condensation curable organopolysiloxanes containing terminal silicon-bonded hydroxy groups in a first component and a metallic salt of an organic carboxylic acid catalyst in a second component.

The organopolysiloxane containing terminal silicon-bonded hydroxy groups is used in a non-catalyst-containing component. The non-catalyst component which contains the base polymer, also designated herein as the organopolysiloxane containing terminal silicon-bonded hydroxy groups, or more frequently designated as the first component, also contains other ingredients, such as, for example, optionally, a filler, and optionally, a cross-linking agent.

The fillers which may be used in the first component with the base organopolysiloxane containing terminal silicon-bonded hydroxy groups are well-known in the art and are generally used as reinforcing or semi-reinforcing fillers for the base polymer. Up to about 50% by weight of the first component or base polymer mixture may contain filler. Thus, the filler of the first component or base polymer component having the organopolysiloxane containing terminal silicon-bonded hydroxy groups, may contain from 0 to about 50% by weight filler. Any conventional filler well-known in the art may be used, including, for example, a reinforcing filler having about 100 to about 300 square meters surface area per gram and a semi-reinforcing filler having a surface area of about 1 to about 20 square meters of surface area per gram. The reinforcing fillers are added when it is desired to have a high strength silicone rubber composition, that is, a composition with high values for tensile strength and percent elongation. Illustrative of the many fillers which can be employed in the present composition, are titanium dioxide, lithopone, zinc oxide, zirconium silicate, silica aerogel, iron oxide, diatomaceous earth, calcium carbonate, fumed silica, precipitated silica, glass fibers, magnesium oxide, chromium oxide, zirconium oxide, aluminum oxide, crushed quartz, calcined clay, asbestos, carbon, graphite, cork, cotton and synthetic fibers. There can also be used silica fillers treated with an organocyclic trimer or tetramer such that the filler is hydrophobic. As explained above, any conventional filler can be used in the compositions and method of the present invention. Certain silica/cross-linking agent combinations are discussed below.

It is optional to incorporate a cross-linking agent in the base polymer or first component of the present invention. A cross-linking agent incorporated in the base polymer generally is used to produce stability in the polysiloxane. When a cross-linking agent is used in a base polymer or first component of the composition, it is generally preferred to use about 1.5 parts by weight to about 20.0 parts by weight, and more preferably from about 1.5 parts by weight to about 6.0 parts by weight (of the total weight of component A) of the cross-linking agent. In the most preferred embodiments, about 3.0 parts by weight of cross-linking agent are used in the mixture of the first component. When less than about 1.5 parts of cross-linking agent are used in component (A), curing can be somewhat slow, and when greater than about 6.0 parts of cross-linking agent are used in the first component, there can be a problem of linear shrinkage in certain instances.

The cross-linking agents may be any of those well-known in the art and discussed in the patents referenced above. Generally, the organic silicates are used as the cross-linking agents in the composition and process of the present invention. One group of organic silicates which may be employed in the practice of the present invention (either unhydrolyzed or hydrolyzed liquid products), are those having the general formula $$RO-\underset{\underset{OR}{|}}{\overset{\overset{OR}{|}}{Si}}-R' \qquad (6)$$

where R and R' are members selected from the group consisting of alkyl groups and halogen-substituted alkyl groups, and R' in addition, represents a member selected from the class consisting of aryl, aralkyl, alkaryl, alkoxy, aryloxy groups and halogenated derivatives of the foregoing aryl, aralkyl, alkaryl, alkoxy and aryloxy groups as discussed in U.S. Pat. No. 2,843,555.

Although the preferable cross-linking agents are the organo silicates discussed above, there may also be used as cross-linking agents, organopolysiloxane resins having a functionality greater than 2 and preferably greater than 2.5. The organopolysiloxane resins are methyl siloxanes or resins which contain both monomethyl and dimethyl or monophenyl units as discussed in U.S. Pat. No. 3,839,246. Other suitable cross-linking agents are organohydrogenpolysiloxanes of the formula, $$R_nHSiO_{3-n/2} \qquad (7)$$

in which R is an alkyl or aryl radical, and n is a number less than 2 but is not 0 as discussed in U.S. Pat. No. 3,696,090 and U.S. Pat. No. 3,839,246. These are disadvantageous because hydrogen gas is evolved during the curing period.

Other suitable cross-linking agents can be used by one skilled in the art.

When the filler used in the base polymer component or the first component is basic, for example, when it is iron oxide, zinc oxide, albacar, and the like, it is generally recommended to utilize the cross-linking agent in the base polymer or first component, however, no cross-linking agent is generally used in the base polymer or first component if silicas, treated silicas, or ground quartz fillers are used.

In the composition and the process of the present invention, in addition to the base polymer or first component, there is also at least a catalyst-containing or second component. The catalyst-containing or second component generally comprises about 5 to about 15 parts by weight per 100 parts by weight of the base polymer mixture, that is, the mixture containing the organopolysiloxane containing terminal silicon-bonded hydroxy groups. The catalyst component generally comprises a metallic salt of an organic carboxylic acid catalyst, a cross-linking agent, a filler and an organopolysiloxane having no silanol groups, that is, an organopolysiloxane which does not contain terminal silicon-bonded hydroxy groups which can be condensed to form a cured organopolysiloxane.

The cross-linking agent used in the catalyst-containing or second component can be any conventional cross-linking agent used in condensation cured room temperature vulcanizable polysiloxane compositions and methods. The cross-linking agent is used in the catalyst-containing component and generally represents from about 1.5% by weight to about 20.0% by weight, and more preferably from about 6% by weight to about 20.0% by weight of the catalyst-containing component. The preferred cross-linking agents are the alkyl silicates. However, any conventional cross-linking agents may be used in the catalyst-containing component of the present composition and process. Specific organic silicates have been discussed above and may also be used in the catalyst-containing component. The preferred organic silicates are shown in formula (6) above and include those wherein R is alkyl, haloakyl, aryl, haloaryl, alkenyl, cycloalkyl or cyanoalkyl, and R' is the same as R and also includes alkoxy or aryloxy. Naturally, it is within the scope of the present invention to use mixtures of cross-linking agents including mixtures of the foregoing organic silicates as well as the other cross-linking agents shown and illustrated above for the base polymer component. It is also within the scope of the present invention to use the cross-linking agents, such as the alkyl silicates, with other agents, such as the nitrogen functional silanes disclosed in U.S. Pat. No. 3,888,815 wherein the silane contains a monovalent hydrocarbon radical or halogenated monovalent hydrocarbon radical, a hydrolyzable group selected from the class consisting of alkoxy, phenoxy, halo and aminodialkylamino as well as a saturated, unsaturated or aromatic hydrocarbon residue functionalized by a member selected from the group consisting of amino, carbonyl, carboxy, isocyano, azo, diazo, thio, halo, ester, and the like. In the composition and process of the present invention, the cross-linking agent must be present in a component other than the base polymer or first component, and in certain cases, the cross-linking agent is present in both the base polymer or first component and the catalyst-containing component or second component. Naturally, it is also within the perview of one skilled in the art to provide additional components and to place the cross-linking agent in a component other than the base polymer component and the catalyst-containing component.

The catalyst-containing component also generally comprises a filler described herein as an extending filler. The filler is generally about 5% by weight to about 50% by weight of the catalyst-containing component. Any conventional filler, for example, the fillers discussed above, may be used in the catalyst-containing or second component of the composition. The treated silica fillers are the preferred fillers for preparing the catalyst-containing component of the composition, otherwise defined herein as the paste catalyst composition. Treated fillers are discussed in detail in U.S. Pat. No. 3,847,848 wherein, for example, a treated silica filler product is prepared by contacting per 100 parts of silica filler having a surface area of at least 50 square meters per gram and containing from 0.2% to 2.0% by weight of moieties selected from the group consisting of hydroxyl groups, water and mixtures thereof, with from 0.5 part to 5.0 parts of a hydroxyl amine having the formula, $$R-\underset{\underset{}{\overset{\overset{R'}{|}}{N}}}-OH \qquad (8)$$

(2) from 2 to 25 parts of cyclic siloxane of the formula, $$(R_2''SiO)_n \qquad (9)$$

and (3) from 1 to 20 parts of a silyl nitrogen compound of the formula, $$(R_3''Si)_aX \qquad (10)$$

wherein the above additives are simultaneously contacted with the filler at a temperature in the range of 100° to 180° C., and removing residual amounts of the additives from the filler, where R is selected from the group consisting of monovalent hydrocarbon radicals, halogenated monovalent hydrocarbon radicals, R, R', R'', and R''' are all selected from the class consisting of hydrogen, monovalent hydrocarbon radicals and halogenated monovalent hydrocarbon radicals, n varies from 3 to 4, a is a whole number that varies from 1 to 2, X is selected from the class consisting of —NR²Y, —ONR₂², and

(11)

where $R^2$ is selected from monovalent hydrocarbon radicals and halogenated monovalent hydrocarbon radicals, and Y is selected from hydrogen and $R_2$ radicals.

As discussed above, in addition to the treated filler, there may be used an untreated filler which may be chosen from any of the well-known untreated fillers that are known in silicone chemistry for room temperature vulcanizable silicone rubber compositions, such as those discussed above. Fumed silica or precipitated silica may also be used in the process and composition of the present invention.

There is also present in a non-base polymer component, such as the catalyst-containing or second component, of the present composition, a non-silanol-containing polyorganosiloxane diluent or carrier for the catalyst. A preferred class of non-silanol-containing polyorganosiloxanes are the alkyl-stopped organopolysiloxanes, such as the methyl or M-stopped organopolysiloxanes. Other examples of non-silanol-containing organopolysiloxanes which may be used as a diluent or carrier for the catalyst, include trimethylsil-stopped polyorganosiloxane and vinyl-stopped polyorganosiloxane. The particular polyorganosiloxane diluent or carrier is not critical in the practice of the present invention as long as it does not contain an end group which will condense in the presence of the catalyst. Generally from about 5.0% by weight to about 50% by weight of the catalyst-containing or second component comprises the non-silanol-containing organopolysiloxane.

The improvements which have been achieved in the composition and method of the present invention, for example, extending the work life of condensation curable organopolysiloxanes containing terminal silicon-bonded hydroxy groups, are the result of the catalyst in the catalyst-containing component or second component of the present invention. The catalyst may be any of the conventional metallic salts of an organic carboxylic acid generally used as a catalyst for the room temperature vulcanizable polysiloxanes wherein the organopolysiloxane base polymer contains terminal silicon-bonded hydroxy groups. Examples of conventional catalysts are described in detail in the patents discussed above.

Generally, the catalyst is a metallic salt of an organic carboxylic acid which promotes the curing of the organopolysiloxane containing terminal silicon-bonded hydroxy groups at or near room temperature, that is, at about 24° C. to about 30° C. In preferred embodiments, the metallic salt of an organic carboxylic acid is one wherein the metal ion is selected from the group consisting of lead, tin, zirconium, antimony, iron, cadmium, barium, calcium, titanium, bismuth and manganese. These catalysts are disclosed in the prior art discussed above and are conventionally used for the condensation curing of the organopolysiloxanes containing terminal silicon-bonded hydroxy groups.

The improvement of the present invention results from maintaining the catalyst inactive at room temperature, that is, at any selected temperature between about 24° C. and 30° C., by providing a solid, inert barrier material which does not promote room temperature curing, that is, curing at a selected temperature between about 24° C. and 30° C., in combination with the catalyst, whereby the catalyst is activated when heat applied thereto melts the solid barrier material.

It is not critical how the catalyst is maintained inactive by the use of the solid, inert barrier material in combination with the catalyst, or in the manner in which the solid inert material forms the barrier between the catalyst and the other elements of the catalyst-containing component and the elements of the base organopolysiloxane polymer component. In preferred embodiments, the solid particles of a metal salt of an organic carboxylic acid catalyst form a core material, and the solid barrier material which is capable of melting at an elevated temperature, is a coating material on the core material, and the coating material melts when heat is applied thereto and releases the core catalyst material. As used herein, the solid, inert barrier material is one capable of melting at an elevated temperature, that is, at any temperature above room temperature, for example, at any temperature above a temperature selected from the range of about 24° C. to about 30° C. Thus, the inert barrier material must be one which does not promote room temperature curing yet one which melts above room temperature. The solid, inert barrier material can melt at any temperature above the room temperature at which the components are maintained either before and/or after mixing of the base organopolysiloxane component and the catalyst-containing component.

In the practice of the present invention, it is critical that the solid barrier material be inert at room temperature that is, at the temperatures at which the components are maintained prior to heating to melt the barrier material, which is generally at room temperature and between about 24' C. and about 30° C. By inert is meant that there is little or no reaction of the barrier material itself with any of the components at room temperature, and there is little or no promotion of room temperature curing of the organopolysiloxane containing terminal silicon-bonded hydroxy groups after the components are mixed. Because the catalyst used in combination with the solid, inert barrier material must be heated to activate the catalyst, the heat causing the solid barrier material to melt and thereby exposing the catalyst which promotes curing of the organopolysiloxane containing terminal silicon-bonded hydroxy groups, the catalyst is referred to as a heat-activated catalyst, even though the catalyst, in certain cases, can cause the curing of the organopolysiloxane containing terminal silicon-bonded hydroxy groups, at room temperature.

In accordance with at least some of the objects of the present invention, and in certain preferred embodiments, there is provided a two-component room temperature vulcanizable polysiloxane composition curable in the presence of a heat-activated catalyst comprising:
(A) 100 parts by weight of a mixture comprised of:
  (i) an organopolysiloxane containing terminal silicon-bonded hydroxy groups,
  (ii) optionally, a cross-linking agent;
  (iii) optionally a filler; and (B) about 5 to about 15 parts by weight of a catalyst-containing component comprised of:
  (iv) a catalytic amount, preferably about 5% to about 12% by weight of component (B), of a catalyst comprised of solid particles of an organic carboxylic acid in which the metal ion is selected from the group consisting of tin, lead, zirconium, antimony, iron, cadmium, barium, calcium, titanium, bismuth and manganese, as a core material, and a solid, inert barrier material which does not promote curing, as a coating material on the core material whereby the coating material melts when heat is applied thereto and releases the core catalyst material;
  (v) about 1.5% to about 20.0% by weight of component (B) of a crosslinking agent,
  (vi) about 5.0% to about 50% by weight of component (B) of a filler; and
  (vii) about 5.0% to about 50% by weight of component (B) of a non-silanol-stopped organopolysiloxane diluent or carrier.

The catalyst in preferred embodiments comprises solid particles of organic carboxylic acid catalyst coated with the inert barrier material. In another preferred aspect of the present invention, there is provided the method of extending the working life of a room temperature vulcanizable organopolysiloxane having terminal silicon-bonded hydroxy groups in a two-component system having in a first component or base organopolysiloxane component (A) a mixture comprised of (i) a base condensation-curable organopolysiloxane containing terminal silicon-bonded hydroxy groups; (ii) optionally, a cross-linking agent; and (iii) optionally, a reinforcing or semi-reinforcing filler, comprising, providing a second catalyst-containing component (B) comprised of (iv) a metallic salt of an organic carboxylic acid catalyst in which the metal ion is selected from the group consisting of tin, lead, zirconium, antimony, iron, cadmium, barium, calcium, titanium, bismuth and manganese, the catalyst being in combination with a solid, inert barrier material capable of melting at an elevated temperature, whereby the catalyst is activated when heat applied thereto melts the solid barrier material; (v) about 1.5% to about 20.0% by weight of component (B) of a crosslinking agent; (vi) about 5% to about 50% by weight of component (B) of a filler; and (vii) about 5.0% to about 50.0% by weight of component (B) of a non-silanol organopolysiloxane diluent or carrier for the catalyst-containing component.

The amount of catalyst is not critical as long as there is a sufficient amount of the catalyst to promote the condensation curing of the organopolysiloxane having terminal silicon-bonded hydroxy groups, that is, a catalytic amount. Generally, in preferred embodiments, about 1.5% to about 12%, and more preferably, about 1.5 to about 6.0% by weight, of the metallic salt of an organic carboxylic acid catalyst is used to promote the condensation curing of the organopolysiloxane.

The prior art discloses a large number of metallic salts of organic monocarboxylic acids and dicarboxylic acids which may be employed with the organopolysiloxanes containing terminal silicon-bonded hydroxy groups to promote the cure by the condensation of the terminal silicon-bonded hydroxy groups on the organopolysiloxane. For example, suitable acid radicals are the ricinate, linoleate, stearate, oleate, as well as the lower radicals, such as, acetate, butyrate, octoate and others which form the necessary metallic salts, such as, naphthenate, and specific examples, such as tin naphtnenate, lead octoate, tin octoate, iron stearate, tin oleate, antimony octoate, tin butyrate, basic dibutyl tin laurate and dibutyl dilaurate, are disclosed in U.S. Pat. No. 3,696,090 and U.S. Pat. No. 2,843,555. Other metal salts of carboxylic acids wherein the metal ranges from lead to manganese, inclusive, in the electromotive series of metals, include such metal salts as, for example, zinc naphthenate, lead naphthenate, cobalt naphthenate, iron-2-ethylhexoate, cobalt octoate, zinc octoate, lead octoate and tin octoate, as well as metal salts in which the metallic ion contains a hydrocarbon substitutent, such as, for example, carbomethoxyphenyl tin trisuberate, isobutyl tin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilactate, dicyclopentyl lead bis-monochloroacetate, dibenzyl lead di-2-pentanoate, diallyl lead di-2-hexanoate, triethyl tin tartrate, tributyl tin acetate, triphenyl tin acetate, tricyclohexyl tin acrylate, tritolyl tin terephthalate, tri-n-propyl acetate, tristeryl lead succinate, trinaphthyl lead p-methylbenzoate, trisphenyl lead cyclohexenyl acetate, triphenyl lead ethylmalonate, basic dimethyl tin oleate and the like, as disclosed in U.S. Pat. No. 3,701,753. Other curing catalysts which are useful as the core material in the composition and process of the present invention, are disclosed in U.S. Pat. No. 3,847,848, U.S. Pat. No. 3,888,815, U.S. Pat. No. 3,445,418, U.S. Pat. No. 3,772,240, and U.S. Pat. No. 3,702,835.

The solid inert barrier material used in combination with the catalyst material, and capable of melting at an elevated temperature whereby the catalyst is activated when heat applied thereto melts the solid barrier material, can be any material which does not promote room temperature curing and which can isolate the catalyst material from the other ingredients in the component or components. It must be capable of melting at an elevated temperature to activate the metallic salt of an organocarboxylic acid catalyst. The solid, inert barrier material cannot promote any substantial amount of curing or condensation of the silanol end stopped groups on the polyorganosiloxane with which it is mixed, until after heat applied thereto, melts the solid barrier material and thereafter exposes the catalyst material within the composition to promote curing either at room temperature or at the temperature at which the composition has been elevated to melt the barrier material.

As used herein, barrier material and wall material are used interchangeably. As explained above, the barrier material is not critical as long as it creates a barrier layer or a wall material upon the catalyst material, and as long as it is inert to the catalyst material, the other ingredients of the components and the vulcanized polysiloxane product at room temperature or at the temperature at which the composition is milled, stored, worked, or otherwise processed until catalytic activity within the composition is desired. Thus, by coating the catalyst with the inert material, it extends the working life of the catalyst to the extent that it has the foregoing properties, however, once the heat is applied thereto, and the catalyst material is activated, it is possible that the inert barrier material can also become a catalyst material at the elevated temperature. Thus, certain metallic salts of carboxylic acids which are inert and can be used as a barrier or wall material at room temperature, become catalyst materials at the melting temperatures at which time the catalyst is activated, thereby producing a catalytic activity concomitant with the catalytic activity of the catalyst. For this reason, certain metallic salts of organic carboxylic acids which are known as catalysts at elevated temperatures, can be used as the solid, inert barrier material at room temperature because they will not become catalysts and promote curing of the organopolysiloxane containing terminal silicon-bonded hydroxy groups until heat is applied thereto.

The amount of barrier or wall material used to maintain the catalyst inactive, is not critical, as long as there is a sufficient amount of barrier or wall material to create a barrier layer or a wall between the catalyst and the other ingredients of the component or components with which it is mixed. Thus, the amount of layer or barrier material is defined broadly herein as the amount required to prevent the catalyst from contacting the other components with which it is mixed. For example, a layer or wall of barrier or coating material may be about 1 micron or less in thickness, or it may be 100 microns or greater in thickness as long as it isolates the activity of the catalyst material from the other ingredients until it melts at an elevated temperature.

In certain preferred embodiments, the solid, inert barrier material is a metallic salt of an organic carboxylic acid which does not promote room temperature curing, that is, curing of the polyorganosiloxane having terminal silcon-bonded hydroxy groups at temperatures between about 24° C. to about 30° C. Further, in certain preferred embodiments, the solid, inert barrier material is a metallic salt of an organic carboxylic acid in which the metal ion is selected from the group consisting of zinc, cobalt, manganese, nickel and calcium which in combination with the organic carboxylic acid radical, does not affect catalytic action.

The acid radical of the barrier material may be derived from any of the commonly known monocarboxylic or dicarboxylic acids or mixtures thereof, and generally include the salts listed above for the catalysts, and in accordance with the composition and process of the present invention, the salts described above may be combined with a suitable metal to produce the inert barrier material when there is no catalytic activity at room temperature. In other embodiments, the solid inert barrier material is a metallic salt of an organic carboxylic acid in which the metal ion is selected from the group consisting of zinc, cobalt, manganese, nickel and calcium, and the organic carboxylic acid salt is selected from the group consisting of octoate, naphthenate, stearate and oleate. In one of the most preferred embodiments of the present invention, the solid, inert barrier material is calcium stearate, and the catalyst is a tin carboxylate.

Another class of catalysts which may be used in the process of the present invention, are the tin soap selected from the group consisting of the formula:

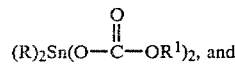, and the formula

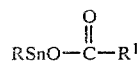

where R and $R^1$ are alkyl radicals of 1 to about 20 carbon atoms, substituted alkyl radicals of 1 to about 8 carbon atoms, aromatic groups of about 6 to about 18 carbon atoms and substituted aromatic groups of about 6 to about 18 carbon atoms.

Certain classes of heat-activated catalyst materials are available from Witco Chemical Company under the tradename SUL-7, which is a tin stearate catalyst material having a carboxylic acid coat melting at 80° C., wherein the catalyst remains dormant when incorporated in a polyorganosiloxane having terminal silicon-bonded hydroxy groups until the melting point of the carboxylic acid coat is reached. Another material available from Witco Chemical Company under the tradename, LRB-1165, is a tin stearate catalyst material having a calcium stearate coating melting at 130° C., the catalyst remaining dormant when incorporated in a polyorganosiloxane mixture containing terminal silicon-bonded hydroxy groups until a temperature of 130° C. is reached.

Any typical technique may be used to create a barrier between the metallic salt of an organic carboxylic acid catalyst material and the other materials of the component or components with the solid, inert barrier material. As discussed above, one preferred method uses a solid metal salt of a carboxylic acid as a core material and the solid, inert barrier material as the wall material. Such compositions may be formed by conventional microencapsulation techniques.

Conventional microencapsulation techniques are discussed in detail at pages 470–493, Volume 15 of Encylopedia of Chemical Technology, Third Edition, Kirk-Othmer (1981). Conventional microencapsulation techniques are used to isolate a reactive core from materials in which the core is incorporated, and any technique which can isolate the reactive core catalyst material of the present invention from the other ingredients in which it is incorporated by coating an inert barrier material thereon, may be used to form the heat-activated catalyst of the present invention.

One such microencapsulation technique consists of the pan coating process wherein finely divided particles of the catalyst material are tumbled in a pan or other device while the inert barrier coating material is applied slowly. Another method for coating solid particles by solutions or melts is the air- or gas-suspension coating technique wherein the solid catalyst particles are coated while suspended in an upward-moving air or gas stream. The catalyst particles are supported by a perforated plate having different patterns of holes inside and outside a cylindrical insert. Just sufficient air or gas is permitted to rise through the outer annular space to fluidize the settling particles. Most of the rising air or gas, preferably in the instant case rising inert gas, is usually heated and flows inside the cylinder, causing the particles to rise rapidly. At the top, as the gas stream diverges and slows, the particles of catalyst material settle back onto the outer bed and move downward to repeat the cycle. The particles pass through the inner cylinder many times in a few minutes. As the particles start upward they encounter a fine spray of the coating solution, either in melt form or in solvent. Only a small amount of solution is applied in each pass. Hence, when a solvent is used, the solvent is driven off, and the particles are nearly dry by the time they fall back onto the outer bed. Since many thin layers of coating can be sprayed onto all surfaces of the randomly oriented particles, a uniform coating is applied even on irregular surfaces.

It is also possible to use spray-drying techniques for microencapsulation of catalyst materials when an active material is dissolved or suspended in a melt and becomes trapped in the dryed particle. The main advantage of this technique is the ability to handle labile materials because of the short contact time in the dryer. When the core material is incorporated into a meltable material, the process is called spray-chilling, since the emulsion or suspension has only to be chilled below its melting point to form particles. Thus, a higher melting core material can remain solid and can be incorporated into a lower-melting barrier or wall material, and thereafter, the suspension has only to be chilled below the melting point of the wall material to form particles. In certain instances, the hardened emulsion technique may be used since the aim of microencapsulation is the formation of many tiny particles. The first step in a number of processes is the formation of an emulsion or suspension of the core material in a solution of the matrix material. This emulsion can be emulsified in another liquid, and the droplets hardened. Emulsions and suspensions can be converted directly to hardened microcapsules by several methods well-known in the art.

The foregoing microencapsulation techniques are merely given as exemplary of encapsulation techniques by which the catalyst material of the present invention can be rendered inactive by using coating material which when heat is applied thereto, melt and expose the inner core catalyst material.

In certain instances, it may be useful to incorporate various additives into the composition or into the catalyst material to prevent oxidation of the catalyst material, or it may be useful to use inert gases during processing. Thus, in accordance with the present invention, an anit-oxidant may be added to the catalyst material or to the component in which the catalyst material is carried to prevent oxidation of the catalyst. Any typical anti-oxidant may be used as long as it does not effect the catalytic activity of th catalyst, the ability of the barrier material to isolate the catalyst from the other ingredients of the component or components and the condensation reaction of the polyorganosiloxane having terminal silicon-bonded hydroxy groups, and the properties of the vulcanized polysiloxane composition.

By using the ingredients and components described above, a cured room temperature vulcanizable organopolysiloxane can be prepared by a condensation reaction by mixing the base organopolysiloxane polymer component wherein the organopolysiloxane contains terminal silicon-bonded hydroxy groups with the catalyst-containing component comprising a metallic salt of an organic carboxylic acid in which the metal ion is selected from the group consisting of tin, lead, zirconium, antimony, iron, cadmium, barium, calcium, titanium, bismuth and manganese, the catalyst being in combination with a solid, inert barrier material capable of melting at an elevated temperature, whereby the catalyst is activated when heat applied thereto melts the solid barrier material, heating the mixture at an elevated temperature sufficient to melt the solid, inert barrier material, thereby releasing the catalyst, and allowing the mixture to cure in the presence of the catalyst. The temperature at which the mixture is heated, depends upon the solid, inert barrier material, and the temperature must only be sufficient to melt the solid, inert barrier material to expose the core catalyst material which normally is an active catalyst at room temperature. Generally, it has been found that most of the preferred inert barrier materials melt at between about 75° C. and about 150° C., however, temperatures as low as 30° C. about up to the decomposition temperature of the catalyst material may be used, depending on the melting point of the particular inert barrier material used to isolate the catalyst material from the other ingredients of the component or components. When the catalyst of the present invention is stored under warehouse storage conditions, it is generally preferred that the coating or barrier material melt at a temperature in excess of 50° C. so that temperatures reached in warehouse conditions will not "trigger", that is, melt, the protective barrier material.

The following examples further define and describe the room temperature vulcanizable polysiloxane compositions curable in the presence of a heat-activated catalyst and the method of extending the working life of condensation curable organopolysiloxanes containing terminal silicon-bonded hydroxy groups prepared by the present invention and illustrate certain preferred embodiments of the present invention.

EXAMPLES

Heat Activated Catalysts

Two catalysts were used in the compositions and process of the present invention. The first catalyst designated herein as catalyst #1 was a white, fine, easily disbursable powder supplied by Witco Chemical Company, under the tradename SUL-7, a tin carboxylate with a carboxylic acid mixture coating having a melting point of 68°-90° C. The second catalyst was also a white, finely-divided powder made of tin carboxylate, such as stannous stearate, stabilized with small amounts of a carboxylic acid coating having a melting point of 130° C. to 133° C. This catalyst requiring a higher temperature for heat activation is referred to herein as catalyst #2.

EXAMPLE 1

This example was designed to determine the effect of various concentrations of base polymer component, catalyst component and anti-oxidant upon the work life of the product. The base polymer was a room temperature vulcanizable silanol-stopped dimethylpolysiloxane having a viscosity of 4,500 centipoise at 25° C. The base polymer (Component A) contained 100 parts of the silanol-stopped dimethylpolysiloxane, 40 parts by weight of calcium carbonate filler, 20 parts by weight of zinc oxide filler and 2 parts by weight condensed ethyl silicate crosslinking agent. Component B was the catalyst material designated above as catalyst #1. The anti-oxidant added to each of the mixtures was a methyldecyl polysiloxane having a methyl group replaced by a hydride which was further reacted with a vinyl group attached to a hindered phenol molecule via a platinum catalyzed hydrosilylation reaction. This is a conventional antioxidant material having the antioxidant built into the methyldecyl polysiloxane chain.

Table 1 below shows the concentrations in parts by weight of five different samples where W/L is work life defined as snap time, and TF/T is tack free time as determined by touch. Hardness of the product is designated by Shore A at the top, "T", and at the bottom, "B", of the sample. The hardness was determined after ten minutes at 80° C.

TABLE 1

CONDENSATION CURED SILANOL STOPPED DIMETHYLPOLYSILOXANE SILICONE RUBBERS PREPARED FROM VARIOUS CONCENTRATIONS OF CATALYST COMPONENT

| | Samples (Parts By Weight) | | | | |
|---|---|---|---|---|---|
| | A | B | C | D | E |
| Base Polymer Component | 50 | 50 | 50 | 50 | 50 |
| Catalyst #1 | 0.5 | 1.0 | 0.25 | 0 | 2.0 |
| Antioxidant | 0.1 | 0.1 | 0.1 | 0.3 | 0.3 |
| *W/L (Room Temp.) Days | >>1 | >1 | 0 | >1 | >1 |
| *W/L (80° C.) Minutes | >60 | 20 | >60 | 10 | 10 |
| *TF/T (80° C.) Minutes | Never | Never | Never | 10 | 10 |
| Shore A | | | | | |
| T | — | — | — | 32 | 32 |
| B | — | — | — | 32 | 32 |

*W/L = Work Life Defined As Snap Time.
*TF/T = Tack Free Time As Determined By Touch.

It is noted from the data in Table 1 that the cured silicone rubbers in samples A, B, D and E all had a work life at room temperature of greater than one day. The work life at 80° C., the heat-activation temperature of the catalyst material, varied and was as low as ten minutes in samples D and E which had high concentrations of the antioxidant and in sample E which had a high concentration of catalyst #1. The only acceptable cured silicone rubbers in regard to tack free time as determined by touch were those prepared from samples D and E.

It was noted from the data in Table 1 that increased concentration of antioxidant improved the tack free time. This is believed to be due to the fact that the catalyst, after being isolated or set free from its coating material at 80° C. comes into contact with air, thus causing oxidation of the catalyst material and diminishing or destroying its catalytic activity. Thus, if an antioxidant is present in the composition to protect the catalyst material from air, the cure is accomplished with less difficulty. This was proven by a test which also provided data on thick section cure capability. A sample of the silanol stopped dimethylpolysiloxane discussed above was mixed and poured into a two-drum vial. The vial was flushed with nitrogen gas, close tightly with a polyseal screw cap and placed in an oven at 80° C. for ten minutes. At the end of ten minutes, the vial was removed, and the glass was smashed to reveal a fully cured slug of silicone rubber. No tackiness was observed in the rubber, and cure was complete throughout the plug as evidenced by no soft or tacky spots. By this test, it was discovered that catalyst #1 performed better in closed systems and in thick sections than conventional tin salts (tin salts of carboxylic acids), making it an ideal candidate for molding and potting applications.

EXAMPLE 2

A catalyst component, designated as a paste catalyst system, was prepared by mixing 44.76 parts of methyl-stopped dimethylpolysiloxane oil having a viscosity of 2,000 centipoise at 25° C., 18.54 parts by weight of a silica filler treated with hexamethyl disilazane, 30 parts by weight of the methyldecylpolysiloxane oil antioxidant described in Example 1, 6.0 parts by weight of catalyst #1 described above (a stannous salt) and 0.70 parts by weight of a green coloring agent. The paste catalyst had a Model RVF Brookfield viscosity, Spindle 7 at 2 RPM of 1,900,000 centipoise at 25° C., and it appeared green in color with paste-like consistency, that is, flowable but thixotropic.

The paste catalyst component prepared above was mixed with the silanol-stopped dimethylpolysiloxane used in Example 1, using 100 parts of the silanol-stopped dimethylpolysiloxane and 10 parts of the paste catalyst. The properties of the mixture and of the cured silicone rubbers for three different samples are shown in Table 2 below. Unless otherwise specified, hardness is designated as Shore A throughout the examples.

TABLE 2

PROPERTIES OF CURED SILANOL STOPPED DIMETHYLPOLYSILOXANE SILICONE RUBBERS PREPARED FROM 100 PARTS BY WT. BASE POLYMER COMPONENT AND 10 PARTS BY WT. PASTE CATALYST COMPONENT

| | SAMPLE | | |
|---|---|---|---|
| | A | B | C |
| *W/L (Room Temp.) Days | 3–4 | 3–4 | 3–4 |
| *W/L (80° C.) Minutes | <5 | <10 | <5 |
| *TF/T (80° C.) Minutes | <5 | <10 | <10 |
| Shore A (10 min.) (80° C.) | | | |
| T | 20 | 27 | 26 |
| B | 20 | 30 | 26 |
| Days Aged At Room Temp. | 0 | 12 | 48 |

*W/L = Work Life Defined As Snap Time.
*TF/T = Tack Free Time As Determined By Touch.

ASTM physical properties were determined by heating a sample of the foregoing mixture of 100 parts of base polymer and 10 parts by weight of paste catalyst component in a metal mold at 80° C. for 1.3 hours. The metal mold necessitated a longer time at 80° C. to heat the mass of metal up to 80° C. The cured silanol-stopped dimethylpolysiloxane silicone rubber taken from the mold had a shore A hardness of 43, a tensile strength of 329 psi, an elongation of 180%, a die B tear of 15 pi and a specific gravity of 1.29.

The paste catalyst composition prepared above showed oil separation after twelve days of storage at room temperature, however, it showed excellent retention of cure times and durometer (Shore A hardness).

A mixture of the base polymer and paste catalyst was left open in the air for three days at room temperature. The bath life was at least three days but by four days, thickening of the mixture occurred, that is, curing of the silanol-stopped dimethylsiloxane was observed. This three-day old material was cured at 80° C. and had a work life of 60, a tack free time as determined by touch at 80° C. of 165 minutes, and a Shore A hardness after 16 minutes at 80° C. of 21 durometer on the top of the sample and 23 durometer on the bottom of the sample. Thus, while some deterioration was noted, bath life appeared very acceptable for commercial use.

EXAMPLE 3

A catalyst component using catalyst #1 described above, was made by eliminating the antioxidant oil. The composition of the paste catalyst component having no antioxidant oil was 74.76 parts by weight, per 100 parts, of methyl-stopped dimethylpolysiloxane oil having a viscosity of 2,000 centipoise at 25° C., 18.54 parts by weight of a silica filler treated with hexamethyldisilazane, 6.0 parts by weight of the catalyst #1 described above (a stannous salt of a carboxylic acid) and a green coloring agent (0.70 parts by weight). The paste catalyst component had a Brookfield viscosity Spindle 7 at 2 RPM of 1,160,000 centipoise at 25° C. The paste catalyst was green in color and had a paste consistency which was flowable but thixotropic.

Ten parts by weight of the paste catalyst described above was mixed with 100 parts of the base polymer composition described in Example 1 above and containing the silanol-stopped dimethylpolysiloxane having a viscosity of 4,500 centipoise (100 parts by weight), 40 parts by weight calcium carbonate, 20 parts by weight zinc oxide and 2 parts by weight of 40% condensed ethyl silicate. The cure and properties of the condensation cured silanol-stopped dimethylpolysiloxane silicone rubbers are set forth in Table 3 below.

TABLE 3

PROPERTIES OF SILANOL STOPPED DIMETHYLPOLY-
SILOXANE SILICONE RUBBERS CURED WITH
CATALYST COMPONENT IN THE
ABSENCE OF ANTIOXIDANT

|  | SAMPLE | |
| --- | --- | --- |
|  | A | B |
| *W/L (Room Temp.) Days | 3 | 3 |
| *W/L (80° C.) Minutes | <2 | <5 |
| *TF/T (80° C.) Minutes | 10 | 10 |
| Shore A (10 min @ 80° C.) | | |
| T* | 22 | 23 |
| B* | 21 | 26 |
| Days Aged at Room Temp. | 0 | 22 |

*W/L = Work Life Defined As Snap Time
*TF/T = Tack Free Time As Determined By Touch
*T = Top
*B = Bottom The paste catalyst component of this example did not have oil separation, however, good cures and shelf age were obtained by using the paste catalyst component of this example.

EXAMPLE 4

A paste catalyst was made as in Example 3 above using a new batch of catalyst #1. The Brookfield viscosity Spindle 7 at 2 RPM was 412,000 centipoise at 25° C. The paste catalyst had a green color and was flowable but thixotropic.

A base polymer component having 100 parts of a silanol-stopped dimethylpolysiloxane with a viscosity of 3,500 centipoise at 25° C., 40 parts by weight of calcium carbonate filler and 3 parts by weight of a 40% condensed ethyl silicate. Ten parts by weight of the paste catalyst having a viscosity of 412,000 centipoise at 25° C. was mixed with 100 parts by weight of the base component. The bath life of the mixed components (Work Life) at room temperature was nine days. The work life of the mixture at 80° C. was 15 minutes. The tack free time as determined by touch was 60 minutes at 80° F. The hardness of the cured polymer at 80° C. after 60 minutes was a Shore A of 17 durometer and after 150 minutes at 80° C. was Shore A of 28 durometer.

Lower viscosity and longer cure times were observed with this batch, however, even with these differences, the paste catalyst composition of this example was acceptable.

EXAMPLE 5

The silanol-stopped dimethylpolysiloxane having a viscosity of 3,500 centipoise at 25° C. of Example 4 was cured at both 10% (4 parts by weight catalyst per 40 parts by weight polysiloxane) and 20% (8 parts by weight catalyst per 40 parts by weight polysiloxane) levels at varying times at 80° C. The base polymer of Example 4 was also cured with conventional dibutyltinlaurate as a comparative experiment. The data is set forth in Table 4 below.

TABLE 4

COMPARISON OF PROPERTIES OF SILANOL-STOPPED DIMETHYL POLYSILOXANE SILICONE RUBBERS
CURED WITH COATED CATALYST AND WITH CONVENTIONAL UNCOATED CATALYST

| Base Polymer (Parts by Wt.) | 40 | 40 | 40 | 40 | 40 | 40 | 40 | 40 | 50 |
| --- | --- | --- | --- | --- | --- | --- | --- | --- | --- |
| Coated Catalyst (Parts by Wt.) | 8 | 4 | 8 | 4 | 8 | 4 | 8 | 4 | — |
| Conventional Catalyst (Parts by Wt.) | — | — | — | — | — | — | — | — | 0.25 |
| Timed Cured @ 80° C., Min. | 30 | 60 | 60 | 90 | 90 | 120 | 120 | 150 | — |
| Timed Cured @ *RT, Hrs. | — | — | — | — | — | — | — | — | 24 Hrs. Press 24 Hrs. Air |
| Top surface tacky after cure schedule *R.T. or 80° C. Cure in above | No | Yes | No | Yes | No | Yes | No | Yes | No |
| Shore A = | 13 | 30 | 39 | 34 | 37 | 35 | 39 | 31 | 45 |
| Tensile, psi = | 153 | 137 | 178 | 132 | 238 | 163 | 238 | 197 | 270 |
| Elongation, % = | 431 | 275 | 158 | 181 | 204 | 220 | 195 | 250 | 187 |
| 100% Modulus, psi = | 26 | 53 | 112 | 80 | 112 | 80 | 115 | 90 | 175 |
| Sp. Gr. = | 1.17 | 1.17 | 1.17 | 1.18 | 1.17 | 1.18 | 1.17 | 1.19 | 1.19 |
| *R.T. @ 80° C. Cure on above & 204° C. (400° F.) 24 hrs. | | | | | | | | | |
| Shore A = | 33 | 42 | 33 | 43 | 36 | 43 | 38 | 43 | 41 |
| Tensile, psi = | 193 | 205 | 203 | 193 | 232 | 192 | 312 | 223 | 203 |
| Elongation, T = | 189 | 196 | 156 | 173 | 172 | 169 | 225 | 187 | 138 |
| 100% Modulus, psi = | 92 | 105 | 120 | 110 | 122 | 112 | 128 | 113 | 148 |
| Sp. Gr. = | 1.18 | 1.18 | 1.18 | 1.18 | 1.18 | 1.19 | 1.18 | 1.18 | 1.20 |

*R.T. = Room Temperature

It is noted from the data in Table 4 that the ASTM sheet surface is tack free after the cure schedule when 20% (8 parts by weight) of the paste catalyst component is used, and that even when full cure at 400° F. is achieved, a lower modulus and greater elongation rubber is obtained with the paste catalyst component, that is, the coated catalyst component, than with the conventional dibutyltinlaurate catalyst. It is pointed out that these ASTM sheets were cast, that is, no mold cover confined the material so that reactions could be observed in air. The low modulus feature is ideal for potting compound applications where a "deader", that is, lower, more elongative rubber, is usually desired to afford shock dampening protection to delicate electronic parts.

EXAMPLE 6

To demonstrate the feasibility of molding where only 1, 2 or a small number of parts are to be made of cured silicone rubber, a gasket was fabricated for a laboratory blender utilizing the base polymer composition and paste catalyst of Example 4. The gasket was prepared by using a 10% paste catalyst concentration, and the mixture was poured onto a primed cover gasket retainer groove and after the mixture attained self level, it was cured at 80° C. for 20 minutes. A higher viscosity silanol-stopped dimethylpolysiloxane rubber composition similar to that of Example 4 but having a higher viscosity was similarly catalyzed with the paste catalyst component of Example 4, and the pouring and cure procedure were repeated. A tight sealing, well-bonded gasket resulted which was acceptable as a replacement for the old gasket. Work life was adequate, and at no time was there any need for rushing in the placing or working of the material, and a finished gasket was prepared in 40 minutes.

EXAMPLE 7

A base polymer component, hereinafter referred to as a "type A" compound containing a silanol-stopped dimethylpolysiloxane polymer, a filler and a cross linker in a first component and a catalyst-containing or second component having a coated catalyst, filler, coloring agent and a non-silanol-stopped dimethylpolysiloxane carrier or diluent, was prepared.

The base polymer component of the type A compound was prepared by mixing per 100 parts, 61.32 parts by weight of a polysiloxane dimethylsilanol stopped polymer blended to 4,500±500 centipoise at 25° C., 24.53 parts by weight calcium carbonate filler, 12.26 parts by weight zinc oxide filler and 1.84 parts by weight of 40% condensed ethyl silicate cross-linking agent, as well as 0.046 parts by weight water.

A catalyst component for the type A compound was prepared by mixing per 100 parts, 74.76 parts of a methyl-stopped dimethylpolysiloxane polymer having a viscosity of 2,000 centipoise at 25° C., 18.54 parts by weight of a treated silica treated with hexamethyldisilazane, 6.0 parts by weight of catalyst #2 described above and 0.70 parts by weight green coloring agent in methyl-stopped dimethylpolysiloxane silicone oil carrier.

The base compound was processed by cold mixing of the fillers, the polymer and the cross linker, and then the batch was paint milled. For the catalyst component, the polymer, filler and coloring agent were cold mixed to a homogeneous mixture, the batch was then heat cycled for one hour at 30 psi steam with full vaccum on the batch (20 mm mercury or less); the batch was then cooled to room temperature; and the catalyst #2 material was mixed therein.

The base compound was a white liquid having a specific gravity of 1.28-1.33 and a Brookfield viscosity #5 at 4 RPM of between 12,500 and 25,000 centipoise at 25° C. The catalyst prepared above was a green paste having a Brookfield viscosity #7 at 2 RPM of 250,000 to 350,000 centipoise at 25° C.

Cure tests using 10% catalyst component, that is, 10 parts of the catalyst component with 100 parts of the base compound component are shown in Table 5 below.

TABLE 5

CURE TESTS OF SILANOL-STOPPED DIMETHYL-POLYSILOXANE SILICONE RUBBERS CURED WITH COATED CATALYST

| | SAMPLES | | | |
|---|---|---|---|---|
| | A | B | C | D |
| Days Aged At Room Temp. | 1 | 15 | 27 | 166 |
| Viscosity of Aged Room Temp. Mixtures in Centipoise | 326,000 | 250,000 | 240,000 | 246,000 |
| Working Time (Days) | >7 | >7 | — | — |

TABLE 5-continued

CURE TESTS OF SILANOL-STOPPED DIMETHYL-POLYSILOXANE SILICONE RUBBERS CURED WITH COATED CATALYST

| | SAMPLES | | | |
|---|---|---|---|---|
| | A | B | C | D |
| W/L (Work Time) (149° C.) in minutes | <10 | <10 | <10 | <10 |
| TF/T (Tack Free Time) (149° C.) in minutes | <10 | <10 | *<10 | *<10 |
| Shore A Hardness (149° C.) For 10 minutes | | | | |
| Top | 9 | 9 | 4 | 0 |
| Bottom | 7 | 6 | 1 | 0 |
| Shore A (durometers) | 30 | 26 | — | — |
| Tensile Strength, psi | 160 | 200 | — | — |
| % Elongation | 210 | 200 | — | — |
| Die B Tear pi | 10 | 14 | — | — |
| Specific Gravity | 1.25 | 1.25 | — | — |

*Sponges

As seen from the data of Table 5, the paste catalyst prepared above did not cure the base compound properly after 27 days of room temperature aging as seen from the low shore A measurements, and the fact that the rubber sponges and blow holes" appeared in the rubber. However, it is conceivable that the base polymer was "out of age", that is, the cross linking agent level was low due to aging. A new base polymer similar to the one described above was prepared but without the zinc oxide filler and using two different cross linking agent levels or concentrations to demonstrate the possibility that the cross linking agent level was low due to aging. This is shown in Example 8 below.

EXAMPLE 8

Two different base compounds were prepared for this example. Base compound A was prepared by mixing per 100 parts, 65.32 parts by weight of a blend of dimethylpolysiloxane silanol-stopped polymers having a blended viscosity of 2,000±500 centipoise at 25° C., 32.66 parts by weight calcium carbonate, 1.96 parts by weight of a 40% condensed ethyl silicate and 0.07% by weight water. The material was mixed and then heat cycled one hour with no vacuum at 40 psi steam. This heat cycle was continued for one hour, full vaccum, at 40 psi steam. The batch, base compound A, had a Brookfield viscosity, spindle #5@4 RPM, of 6500 centipoise at 25° C.

Base compound B was prepared by mixing, per 100 parts, 64.02 parts by weight of the foregoing dimethylpolysiloxane silanol-stopped blend, 32.01 parts by weight of calcium carbonate, 3,84 parts by weight of a 40% condensed ethyl silicate and 0.13 parts by weight water. The batch, base compound B had a Brookfield viscosity Spindle #5@4 RPM of 4,500 centipoise at 25° C. Aging tests and work life of the two batches cured with 10% catalyst component of Example 7 are recorded in Table 6 below.

TABLE 6

AGING TESTS AND WORK LIFE OF DIFFERENT BATCHES OF SILANOL-STOPPED DIMETHYL-POLYSILOXANE CURED WITH COATED CATALYST

| | Batch A Base Compound | Batch B Base Compound | |
|---|---|---|---|
| Days Aged at Room Temp. Before Use | 15 | 15 | 154 |
| Working Time (Days) | — | >4 | >4 |
| Work Life (149° C.) Minutes | 15 | <10 | <10 |

TABLE 6-continued
AGING TESTS AND WORK LIFE OF DIFFERENT BATCHES OF SILANOL-STOPPED DIMETHYL-POLYSILOXANE CURED WITH COATED CATALYST

|  | Batch A Base Compound | Batch B Base Compound | |
|---|---|---|---|
| Tack Free Time (149° C.) Minutes | 15 | <10 | <10 |
| Shore A (149°) | | | |
| 10 Minutes in *T/B | 0/0 | 24/22 | 17/12 |
| 20 Minutes in *T/B | 0/0 | 28/22 | 19/14 |

*T = Top
*B = Bottom

From the data in Table 6, it is noted that with the cross linking agent destroyed by heat cycling, there is curing, however, the durometers are 0. Batch B with the fresher cross linking agent added to replace the destroyed cross linking agent, cures well with the catalyst component with slight durometer changes after 154 days of room temperature shelf aging of base and catalyst components of the system.

The physical properties of Batch B cured with 10% of the catalyst component are not quite as good as the cure of the polymer in Example 7. Thus, although there is curing, this compound is of less commercial interest, except where low viscosity compounds are desired, and physical properties are less important, that is, potting applications.

It is also noted that the catalyzed mix of batch B and the 10% catalyst component can be aged ten days at room temperature and then heat cured at 149° C. (300° F.) in ten minutes. As observed from the Shore A hardness tests, the catalyzed bath life for working time is greater than four days as reported in the above table, and is in fact at least ten days.

EXAMPLE 9

This example was carried out with a base compound and catalyst component described above as type B compounds.

A type B base compound was prepared by mixing 43.9 parts by weight, per 100 parts, of a silanol-stopped dimethylpolysiloxane having a viscosity of 30,000 centipoise at 25° C., 18.81 parts by weight of a dimethylpolysiloxane end-stopped with trimethyl units having a viscosity of 2,000 centipoise at 25° C. used as a plasticizing oil, 18.81 parts by weight of a treated precipitated silica filler, 0.71 parts of a titanium dioxide filler, 0.35 parts by weight of silanol-stopped dimethylpolysiloxane having a viscosity of 3,500 centipoise at 25° C., 16.93 parts by weight of a trimethylsiyl-stopped dimethylpolysiloxane having a viscosity of 20 centipoise at 25° C. and 1.0 part by weight of a short-chained silanol.

A type B catalyst was prepared by using 83 parts by weight, per 100 parts, of the catalyst of Example 7 and mixing 17 parts by weight of a 40% condensed ethyl silicate cross linking agent therewith.

To 25 parts by weight of the foregoing type B base compound, was added 3 parts by weight of the foregoing type B catalyst component. The room temperature working time of the mixture was seven days, that is, the coated type B catalyst material did not sufficiently catalyze the base type B polymer for a period of seven days so that the mixture could be worked or maintained at room temperature before any noticeable catalyzation occurred. The work life at 148.89° C. (300° F.) was less than 10 minutes. The hardness measured in Shore A after 10 minutes at 148.89° C. was 19 durometer at the top and 18 durometer at the bottom of the sample.

The foregoing mixture was re-cured after aging the catalyzed mixture seven days at room temperature. The hardness of the re-cured silicone rubber, re-cured at 148.89° C. after 10 minutes, was 15 durometer at the top and 15 durometer at the bottom as measured in Shore A hardness.

Another catalyzed mix was made using 100 parts per weight of the type B base polymer above, 20 parts by weight of a trimethylsiyl-stopped dimethylpolysiloxane having a viscosity of 20 centipoise at 25° C. and 14.4 parts by weight of the above type B catalyst. The mixture was de-aired for 15 minutes and cured in an open teflon mold at 148.89° C. or six hours. The cured silanol-stopped dimethylpolysiloxane silicone rubber had a Shore A hardness of 13, a tensile strength of 157 psi, a percent elongation of 370, a die B tear of 28 pounds per inch and a specific gravity of 1.06.

In another catalyzed mix of type B components, a base compound was made by adding 80 parts by weight of a silanol-stopped dimethyl polysiloxane having a viscosity of 9,000 centipoise at 25° C. to 20 parts by weight of the above type B base compound having 43.9 parts of a silanol-stopped dimethylpolysiloxane with a viscosity of 30,000 centipoise at 25° C. and the other ingredients listed above, as well as a ground silica and a short chained silanol. To 150 parts of this type B base compound was added 18 parts by weight of the above catalyst. The mixture was de-aired for 15 minutes and cured at 148.89° C. (300° F.) for 4 hours. The cured silicone rubber had a Shore A hardness of 37, a tensile strength of 243 psi, a percent elongation of 140, a die B tear of 22 pounds per inch and a specific gravity of 1.43.

The above materials, once catalyzed, are both pourable, but just acceptably so, for self-leveling in open teflon molds.

The trimethylsiyl-stopped dimethylpolysiloxane used in conjunction with the above type B base polymer was used to plasticze the base polymer to make an ASTM sheet in an open mold. The open molds permitted the observation of the self-leveling properties of the materials.

There are several advantages to the type B system used in the present example. First, it permits the use of treated fillers, since the cross linking agents do not age well in base compounds which use treated silica fillers. Furthermore, less accurately neutralized (acid/base) silicone polymers will not interfere with the stability of type B base compounds made without the presence of the cross linking agent. It is also possible to make higher strength materials at lower viscosities by using the type B system.

EXAMPLE 10

This example was designed to make very pourable higher strength compounds.

The base compound was made by mixing 84.75 parts by weight, per 100 parts, of a silanol-stopped dimethylpolysiloxane having a viscosity of between 2,500 and 3,500 centipoise at 25° C. and 15.25 parts of a treated silica filler with hexamethyldisilazane. The polymer was mixed with the filler and then heat cycled one hour at full vaccum and 30 psi steam. The entire batch was paint milled twice on a three roll mill. The base polymer was a translucent compound having a viscosity of 19,000 centipoise measured at 25° C. on a Brookfield viscometer Spindle 6 at 10 PRM.

A catalyst component (Catalyst No. 1) was made by mixing 38.79 parts by weight of a methyl-stopped dimethylpolysiloxane oil having a viscosity of 2,000 centipoise at 25° C. and 38.79 parts by weight of calcium carbonate filler. The batch was then heat cycled at full vaccum under 30 psi steam for one hour. Upon cooling to room temperature, the catalyst identified above as catalyst #2 (a tin soap catalyst coated with a carboxylic acid) (4.91 parts by weight) was added to the foregoing mixture and mixed. The batch was paint milled twice on a three roll mill. After the mixing on the three roll mill, 17 parts by weight of a 40% condensed ethyl silicate was mixed into the batch along with 0.51 parts by weight of a color agent. A pale green paste catalyst resulted having a Brookfield viscosity at 25° C. on Spindle 6 at 4 rpm of 65,000 centipoise, on Spindle 6 at 10 RPM of 31,000 centipoise and on Spindle 6 at 20 RPM of 20,000 centipoise.

A second catalyst (Catalyst No. 2) identical to the above catalyst was mixed except it was not paint milled.

A third catalyst (Catalyst No. 3) was made in which diatomaceous silica was substituted for calcium carbonate filler in the above paint milled catalyst composition. This catalyst had the following Brookfield viscosities at 25° C.:

|  | Batch 1 | Batch 2 |
|---|---|---|
| Spindle 7 @ 20 = | 94,000 cps. | 86,000 cps |
| Spindle 7 @ 10 = | 152,000 cps. | 136,000 cps. |
| Spindle 7 @ 4 = | 300,000 cps. | 275,000 cps. |
| Spindle 7 @ 2 = | 520,000 cps. | 480,000 cps. |

The cured properties of the foregoing polymer base was cured with the three catalyst materials described above. The cured properties are shown in Table 7 below.

TABLE 7
PROPERTIES OF TYPE B SYSTEM SILANOL STOPPED DIMETHYLPOLYSILOXANE CURED WITH THREE DIFFERENT CATALYST PREPARATIONS

|  | [1]Catalyst No. 1 | [2]Catalyst No. 2 | [3]Catalyst No. 3 |
|---|---|---|---|
| Base Compound: Catalyst Ratio | 10:1 | 10:1 | 10:1 |
| Working Time (Room Temp.) Days | >4 | >4 | >4 |
| Work Life (300° F.) Minutes | <10 | <10 | <10 |
| Shore A Hardness (149° C./10 Min.) |  |  |  |
| Top | 31 | 29 | 33 |
| Bottom | 27 | 24 | 26 |
| ASTM PROPERTIES AFTER 1.5 HOURS AT 149° C. (300° F.) | | | |
| Shore A Hardness | 31 | 29 | 32 |
| Tensile Strength, p.s.i. | 290 | 168 | 350 |
| % Elongation | 280 | 200 | 300 |
| Die B Tear, pi | 46 | 23 | 44 |
| Specific Gravity | 1.07 | 1.08 | 1.08 |

[1]Catalyst #1 = Paint milled using calcium carbonate.
[2]Catalyst #2 = Not paint milled using calcium carbonate.
[3]Catalyst #3 = Paint milled using diatomaceous silica filler in place of calcium carbonate filler.

It can be seen from the foregoing data that outside of improved tensile strength, improved elongation and improved tear over the cured compounds reported above, is the fact that both the base polymer component and the catalyst component are paint milled to obtain optimum physical properties.

EXAMPLE 11

To obtain a higher viscosity in the polymer base of Example 10, that is, greater than 19,000 centipoise at 25° C., additional treated silica filler could be added, up to at least about 30 parts by weight per 100 parts of silanol-stopped dimethylpolysiloxane polymer with a subsequent increase in strength of the cured rubber. While this was not carried out, a blend of 50 parts by weight of the base compound of Example 10 was mixed with 50 parts by weight of the base compound identified above in Example 9 and containing 20 parts by weight of the base type B compound prepared in Example 9 using silanol-stopped dimethylpolysiloxane having a viscosity of 30,000 centipoise at 25° C. (43.9 parts by weight) in addition to the other ingredients listed in Example 9, along with the 80 parts of a silanol-stopped dimethylpolysiloxane having a viscosity of 9,000 centipoise at 25° C., ground silica and a short-chained silanol. This blend was catalyzed with 10% of catalyst #1 in Example 10 above.

After 1.5 hours at 140° C. (300° F.) in an open teflon mold, the cured silicone rubber had a Shore A hardness of 41, a tensile strength of 400 psi, a percent elongation of 220, a die B tear of 22 pi and a specific gravity of 1.23.

In all of the foregoing type B compound catalysts, the cross linking agent, a 40% condensed ethyl silicate, was present. Shelf age data shows that the catalysts prepared in Example 10 above are shelf stable, as shown in Example 12 below. It is believed that the shelf age as observed to date is excellent, however, even in the cases where shelf age might be poor, the foregoing data indicates that three component systems are commercially feasible with the coated catalyst compositions which are heat-activated as catalyst components. This is due primarily to the fact that these compounds, after catalyzation, have "bath lives" in excess of four days. Thus, large catalyzed batches can be made carefully as a three-part system by a person skilled in the art and then stored for use.

EXAMPLE 12

Catalyst No. 1 and Catalyst No. 3 of Example 10 were aged on the shelf at room temperature to determine if they had a commercially acceptable shelf age. The data in Table 8 below demonstrate that the shelf aged catalysts possessed a commercially acceptable shelf age. The tests were conducted with a base compound: catalyst ratio of 10:1 using the base compound of Example 10 above.

TABLE 8
ROOM TEMPERATURE SHELF AGE TESTS ON CATALYST NO. 1 AND CATALYST NO. 3 USING BASE COMPOUND OF EXAMPLE 10 AT A 10:1 BASE:CATALYST RATIO

|  | CATALYST No. 1 | | | | CATALYST No. 2 | | | |
|---|---|---|---|---|---|---|---|---|
| Days Aged at Room Temp. Before Catalyzation | 0 | 59 | 326 | 498 | 0 | 56 | 326 | 498 |

TABLE 8-continued

ROOM TEMPERATURE SHELF AGE TESTS ON
CATALYST NO. 1 AND CATALYST NO. 3
USING BASE COMPOUND OF EXAMPLE 10 AT
A 10:1 BASE:CATALYST RATIO

| | CATALYST No. 1 | | | | CATALYST No. 2 | | | |
|---|---|---|---|---|---|---|---|---|
| Brookfield Viscosity (Model RVF) in X$10^3$ CPS at 25° C.: | | | | | | | | |
| Spindle 6 @ 4 RPM | 65 | 73 | 68 | 65 | | | | |
| Spindle 6 @ 10 RPM | 31 | 36 | 36 | 37 | | | | |
| Spindle 6 @ 20 RPM | 20 | 25 | 24 | 23 | | | | |
| Spindle 7 @ 20 RPM | | | | | 94 | 80 | 63 | 74 |
| Spindle 7 @ 10 RPM | | | | | 152 | 120 | 99 | 112 |
| Spindle 7 @ 4 RPM | | | | | 300 | 230 | 200 | 210 |
| Spindle 7 @ 2 RPM | | | | | 520 | 400 | 350 | 360 |
| Working Time (Room Temp) Days | >4 | >4 | >4 | >4 | >4 | >4 | >4 | >4 |
| Work Life (200° F.) Min. | <10 | <10 | <10 | <10 | <10 | <10 | <10 | <10 |
| Shore A Hardness (149° F./10 Min.) | | | | | | | | |
| Top | 31 | 29 | 22 | 20 | 33 | 30 | 23 | 22 |
| Bottom | 23 | 27 | 18 | 20 | 20 | 28 | 22 | 20 |

EXAMPLE 13

Catalyst No. 1 and Catalyst No. 3 of Example 12 were aged at 50° C. to provide accelerated age tests. The catalysts were aged at 50° C. for the number of days shown in Table 9 below and then used to catalyze the base compound of Example 10 at a base to catalyst ratio of 10:1. The data of Table 9 demonstrate that these catalysts can be stored at storage conditions of up to 50° C. (considered standard under the temperature experienced under warehouse storage conditions) without "triggering" the protective barrier coating of the catalyst.

TABLE 9

ACCELERATED 50° C. SHELF AGE
TESTS ON CATALYST NO. 1 and NO. 3
USING BASE COMPOUND OF EXAMPLE 10
AT A 10:1 BASE: CATALYST RATIO

| TESTS | | | | CATALYST No. 1 | | | CATALYST No. 3 | | |
|---|---|---|---|---|---|---|---|---|---|
| Brookfield Viscosity Model RVF | Spindle | @ | RPM | | | | | | |
| In $10^3$ CPS | 6 | | 4 | 58 | 70 | 75 | | | |
| " | 6 | | 10 | 29 | 38 | 39 | | | |
| " | 6 | | 20 | 18 | 24 | 26 | | | |
| " | 7 | | 20 | — | — | — | 86 | 126 | 123 |
| " | 7 | | 10 | — | — | — | 136 | 180 | 188 |
| " | 7 | | 4 | — | — | — | 275 | 340 | 350 |
| " | 7 | | 2 | — | — | — | 480 | 580 | 580 |
| Working Time (Room Temp.) Days | | | | >4 | =9 | =9 | >4 | =9 | =9 |
| Shore A @ 300° F./10 Minutes | Top | | | 32 | 28 | 28 | 32 | 31 | 29 |
| | Bottom | | | 30 | 25 | 26 | 30 | 28 | 28 |
| 1.5 HRS/300° F. ASTM Cured Sheet Physicals | | | | | | | | | |
| Shore A | | | | — | — | 28 | — | — | 34 |
| Tensile, psi | | | | — | — | 290 | — | — | 315 |
| Elongation, % | | | | — | — | 300 | — | — | 270 |
| Die B Tear, p.i. | | | | — | — | 38 | — | — | 48 |
| Sp. Gr. | | | | — | — | 1.08 | — | — | 1.08 |
| Days Catalyst Was Aged @ 50° C. Before Catalyzation | | | | 0 | 13 | 55 | 0 | 13 | 55 |

From the foregoing, it is evident that high strength two-part or two-component room temperature vulcanizable silanol-stopped dimethylpolysiloxane silicone rubbers can be made with paint mill processing. These compounds can be made at least as low as 19,000 centipoise at 25° C. and possibly lower. It has been shown that the silanol-stopped dimethylpolysiloxane base polymers give good thick section cure by using the catalysts coated with an inert barrier material which does not melt at room temperature but melts at an elevated temperature to expose or release the catalyst. Furthermore, the cured rubbers appear to have good hydrolytic stability and fast cure times at the elevated temperatures used to melt the inert barrier material coated upon the catalyst. It has also been shown that extended working times, that is, long work times, of the mixed catalyzed materials, that is, the mixture of the base polymer component and the catalyst component, can be kept at room temperatures for a minimum of four days. Furthermore, a paste catalyst system using the catalyst having the inert barrier material mixed with a cross linking agent has been made, and this allows the use of high strength technology in the base polymers components.

In accordance with the objects of the present invention, a new series of room temperature vulcanizable polysiloxane compositions curable in the presence of a heat-activated catalyst have been made.

The room temperature, condensation curable organopolysiloxanes containing terminal silicon-bonded hydroxy groups in a first component and a metallic salt of an organic carboxylic acid catalyst in a second component of the present invention have an extended bath life or working life. The components of two-component room temperature vulcanizable polysiloxane compositions of the present invention wherein the organopolysiloxane contains terminal silicon-bonded hydroxy groups curable in the presence of a metallic salt of an organic carboxylic acid can be mixed at room temperature with little or no curing until the catalyst is activated by heat.

While other modifications of the invention and variations thereof which may be employed within the scope of the invention, have not been described, the invention is intended to include such modifications as may be embraced within the following claims.

What is claimed is:

1. A two-component room temperature vulcanizable polysiloxane composition curable in the presence of a heat-activated catalyst comprising:
   (A) 100 parts by weight of a mixture comprised of:
      (i) an organopolysiloxane containing terminal silicon-bonded hydroxy groups;
      (ii) optionally, a cross linking-agent; and
      (iii) optionally, a filler; and
   (B) about 5 to about 15 parts by weight of a catalyst-containing component comprised of:
      (iv) a catalyst comprising a metallic salt of an organic carboxylic acid in which the metal ion is selected from the group consisting of lead to manganese in the periodic table of the elements, the catalyst being in combination with a solid, inert barrier material which is a metallic salt of an organic carboxylic acid in which the metal ion is selected from the group consisting of zinc, cobalt, manganese, nickel and calcium, which in combination with the organic carboxylic acid radical does not promote catalytic action at room temperature, but which solid, inert barrier material is capable of melting at elevated temperature, whereby the catalyst is activated when heat applied thereto melts the solid barrier material;
      (v) about 1.5 to about 20.0 weight percent of component (B) of a cross-linking agent;
      (vi) about 5 to about 50 weight percent of component (B) of a filler; and
      (vii) about 5.0 to about 50.0 weight percent of component (B) of a polyorganosiloxane having no silanol-stopped terminal groups.

2. A two-component room temperature vulcanizable polysiloxane composition curable in the presence of a heat-activated catalyst comprising:
   (A) 100 parts by weight of a mixture comprised of:
      (i) an organopolysiloxane containing terminal silicon-bonded hydroxy groups;
      (ii) optionally, a cross-linking agent;
      (iii) up to about 50 weight percent of component (A) of a filler; and
   (B) about 5 to about 15 parts by weight of a catalyst-containing component comprised of:
      (iv) a catalyst comprised of solid particles of a metal salt of an organic carboxylic acid in which the metal ion is selected from the group consisting of tin, lead, zirconium, antimony, iron, cadmium, barium, calcium, titanium, bismuth and manganese, as a core material, and a solid, inert barrier material which is a metallic salt of an organic carboxylic acid in which the metal ion is selected from the group consisting of zinc, cobalt, manganese, nickel and calcium, which in combination with the organic carboxylic acid radical does not promote room temperature curing, but which solid, inert barrier is capable of melting at an elevated temperature, as a coating material on the core material, whereby the coating material melts when heat is applied thereto and releases the core catalyst material;
      (v) about 1.5 to about 20.0 weight percent of component (B) of a cross-linking agent;
      (vi) about 5 to about 50 weight percent of component (B) of a filler; and
      (vii) about 5.0 to about 50.0 weight percent of component (B) of an alkyl-stopped organopolysiloxane carrier.

3. The two-component room temperature vulcanizable polysiloxane composition of claims 1 or 2 wherein the organic carboxylic acid salt of the solid, inert barrier material of (B)(iv) is selected from the group consisting of octoate, naphthenate, stearate and oleate.

4. The two-component room temperature vulcanizable polysiloxane composition of claims 1 or 2 wherein the solid inert barrier material of (B)(iv) is calcium stearate, and the catalyst of (B)(iv) is a tin carboxylate.

5. The two-component room temperature vulcanizable polysiloxane composition of claims 1 or 2 wherein the catalyst is the metallic salt of an organic monocarboxylic acid or the metallic salt of an organic dicarboxylic acid.

6. The two-component room temperature vulcanizable polysiloxane composition of claims 1 or 2 wherein the catalyst is selected from the group consisting of the formula:

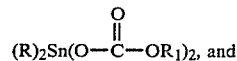

and the formula:

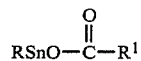

where R and $R^1$ are alkyl radicals of 1 to about 20 carbon atoms, substituted alkyl radicals of 1 to about 8 carbon atoms, aromatic groups of about 6 to about 18 carbon atoms and substituted aromatic groups of about 6 to about 18 carbon atoms.

7. The two-component room temperature vulcanizable polysiloxane composition of claims 1 or 2 wherein the cross-linking agent is an organic silicate.

8. The two-component room temperature vulcanizable polysiloxane composition of claims 1 or 2 wherein the cross-linking agent is condensed ethyl silicate.

9. The two-component room temperature vulcanizable polysiloxane composition of claims 1 or 2 further comprising an anti-oxidant to prevent oxidation of the catalyst.

10. The cured compostion obtained from a mixture of the ingredients of claims 1 or 2.

11. A method of extending the working life of condensation curable organopolysiloxanes containing terminal silicon-bonded hydroxy groups in a first component and a metallic salt of an organic carboxylic acid catalyst in a second component, comprising providing in combination with the metallic salt of an organic carboxylic acid catalyst, a solid inert barrier material which is a metallic salt of an organic carboxylic acid in which the metal ion is selected from the group consisting of zinc, cobalt, manganese, nickel and calcium, which in combination with the organic carboxylic acid radical does not promote catalytic action at room temperature, but which solid, inert barrier material is capable of melting at an elevated temperature, whereby the catalyst is activated when heat applied thereto melts the solid barrier material.

12. A method of extending the working life of a room temperature vulcanizable organopolysiloxane having terminal silicon-bonded hydroxy groups in a two-component system having a first component (A) which is a mixture comprised of (i) a base condensation-curable orgnopolysiloxane containing terminal silicon-bonded hydroxy groups; (ii) optionally, a cross-linking agent; and (iii) optionally, a filler, comprising, providing a second catalyst-containing component (B) comprised of (iv) a metallic salt of an organic carboxylic acid catalyst in which the metal ion is selected from the group consisting of tin, lead, zirconium, antimony, iron, cadmium, barium, calcium, titanium, bismuth and manganese, the catalyst being in combination with a solid, inert barrier material which is a metallic salt of an organic carboxylic acid in which the metal ion is selected from the group consisting of zinc, cobalt, manganese, nickel and calcium, which in combination with the organic carboxylic acid radical does not promote catalytic action at room temperatue, but which solid, inert barrier material is capable of melting at an elevated temperature, whereby the catalyst is activated when heat applied thereto melts the solid barrier material; (v) about 1.5 to about 20.0 weight percent of component (B) of a cross-linking agent; (vi) about 5 to about 50 weight percent of component (B) of a non-hydroxy terminated organopolysiloxane.

13. The method of claim 11 wherein the metal ion of the metallic salt of an organic carboxylic acid catalyst is selected from the group consisting of tin, lead, zirconium, antimony, iron, cadmium, barium, calcium, titanium, bismuth, and manganese.

14. The method of claims 11 or 12 wherein about 5 to about 15 parts by weight of the second component are used per 100 parts by weight of the first component.

15. The method of claims 11 or 12 wherein the catalyst is the metallic salt of an organic monocarboxylic acid.

16. The method of claims 11 or 12 wherein the catalyst is the metallic salt of an organic dicarboxylic acid.

17. The method of claims 11 or 12 wherein the organic carboxylic acid salt of the solid, inert barrier material is selected from the group consisting of octoate, naphthenate, stearate and oleate.

18. The method of claims 11 or 12 wherein the solid inert barrier material is calcium stearate, and the catalyst is a tin carboxylate.

19. The method of claims 11 or 12 wherein the catalyst is selected from the group consisting of the formula:

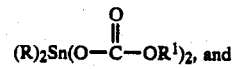

the formula:

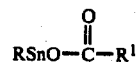

where R and R' are alkyl radicals of 1 to about 20 carbon atoms, substituted alkyl radicals of 1 to about 8 carbon atoms, aromatic groups of about 6 to about 18 carbon atoms, and substituted aromatic groups of about 6 to about 18 carbon atoms.

20. The method of claims 11 or 12 further comprising an anti-oxidant to pevent oxidation of the catalyst.

21. The method of claims 11 or 12 further comprising a coloring agent.

22. The method of claim 12 wherein the cross-linking agent is an organic silicate.

23. The method of claim 22 wherein the organic silicate cross-linking agent is condensed ethyl silicate.

24. The method claim 12 wherein the non-hydroxy terminated organopolysiloxane is an alkyl-stopped organopolysiloxane.

25. The method of claim 24 wherein the alkyl-stopped organopolysiloxane is a methyl-stopped organopolysiloxane.

26. The method of claim 24 wherein the alkyl-stopped organopolysiloxane is a vinyl-stopped organopolysiloxane.

27. The method of claim 12 wherein the cross-linking agent of component (B)(v) is about 6.0 to about 20 weight percent of component (B).

28. A process for forming a cured room temperature vulcanizable, condensation-curable organopolysiloxane, comprising: mixing (A) 100 parts by weight of a first component comprised of (i) a base organopolysiloxane containing terminal silicon-bonded hydroxy groups, (ii) optionally, a cross-linking agent; and (iii) optionally, a filler; with (B) about 5 to about 15 parts by weight of a catalyst-containing second component comprised of (iv) a catalyst comprising a metallic salt of an organic carboxylic acid in which the metal ion is selected from the group consisting of tin, lead, zirconium, antimony, iron, cadmium, barium, calcium, titanium, bismuth and manganese, the catalyst being in combination with a solid, inert barrier material which is a metallic salt of an organic carboxylic acid in which the metal ion is selected from the group consisting of zinc, cobalt, manganese, nickel and calcium, which in combination with the organic carboxylic acid radical does not promote catalytic action at room temperature, but which solid, inert barrier material is capable of melting at an elevated temperature, whereby the catalyst is activated when heat applied thereto melts the solid barrier material; (v) about 1.5 to about 20.0 weight percent of component (B) of a cross-linking agent; (vi) about 5 to about 50 weight percent of component (B) of an organopolysiloxane having no silanol-stopped terminal groups; and heating the mixture at an elevated temperature sufficient to melt the solid, inert barrier material, thereby releasing the catalyst; and allowing the mixture to cure in the presence of the catalyst.

29. The process of claim 28 wherein the organic carboxylic acid radical of the inert, barrier material is selected from the group consisting of octoate, naphthenate, stearate and oleate.

30. The process of claim 28 wherein the solid, inert barrier material is calcium stearate, and the catalyst is a tin carboxylate.

31. The process of claim 28 wherein the catalyst is the metallic salt of an organic monocarboxylic acid.

32. The process of claim 28 wherein the catalyst is the metallic salt of an organic dicarboxylic acid.

33. The process of claim 28 wherein the catalyst is selected from the group consisting of the formula:

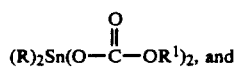
$(R)_2Sn(O-C-OR^1)_2$, and the formula:

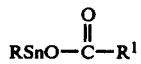
$RSnO-C-R^1$ where R and $R^1$ are alkyl radicals of 1 to about 20 carbon atoms, substituted alkyl radicals of 1 to about 8 carbon atoms, aromatic groups of about 6 to about 18 carbon atoms and substituted aromatic groups of about 8 to about 18 carbon atoms.

34. The process of claim 28 wherein the cross-linking agent is an organic silicate.

35. The process of claim 28 wherein the organic silicate cross-linking agent is condensed ethyl silicate.

36. The process of claim 28 further comprising adding an anti-oxidant to prevent oxidation of the catalyst.

37. The process of claim 28 further comprising mixing a coloring agent in at least one of the components.

* * * * *